US 8,006,178 B2

(12) United States Patent
Parsell

(10) Patent No.: US 8,006,178 B2
(45) Date of Patent: Aug. 23, 2011

(54) MARKUP LANGUAGE STYLIZATION

(75) Inventor: Ryan D Parsell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/151,753

(22) Filed: Jun. 14, 2005

(65) Prior Publication Data

US 2006/0282766 A1    Dec. 14, 2006

(51) Int. Cl.
G06F 17/24    (2006.01)

(52) U.S. Cl. ............ 715/236; 707/1; 715/205; 715/513; 719/217

(58) Field of Classification Search .................. 715/513, 715/205, 236; 709/217; 719/217; 707/1
See application file for complete search history.

(56) References Cited

U.S. PATENT DOCUMENTS

| | | | |
|---|---|---|---|
| 5,826,025 A * | 10/1998 | Gramlich | 709/217 |
| 6,023,714 A * | 2/2000 | Hill et al. | 715/235 |
| 6,055,544 A * | 4/2000 | DeRose et al. | 707/104.1 |
| 6,101,509 A * | 8/2000 | Hanson et al. | 715/205 |
| 6,182,142 B1 * | 1/2001 | Win et al. | 709/229 |
| 6,329,994 B1 * | 12/2001 | Gever et al. | 345/473 |
| 6,442,755 B1 * | 8/2002 | Lemmons et al. | 725/47 |
| 6,675,354 B1 * | 1/2004 | Claussen et al. | 715/205 |
| 7,047,487 B1 * | 5/2006 | Bates et al. | 715/234 |
| 7,167,603 B2 * | 1/2007 | Fukuda | 382/305 |
| 2002/0103822 A1 * | 8/2002 | Miller | 707/501.1 |
| 2002/0116421 A1 * | 8/2002 | Fox et al. | 707/526 |
| 2005/0050002 A1 * | 3/2005 | Slotznick | 707/1 |
| 2006/0150107 A1 * | 7/2006 | Leung et al. | 715/745 |

* cited by examiner

*Primary Examiner* — Boris Pesin
*Assistant Examiner* — Elizabeth G Wright
(74) *Attorney, Agent, or Firm* — Lee & Hayes, PLLC

(57) ABSTRACT

Markup language stylizations that may be applied to a source document are defined in overlay documents such that no special tags or markers are required in the source document to enable stylization via the overlay document. A manifest document defines an association between a source document and one or more overlay documents.

21 Claims, 9 Drawing Sheets

MARKUP LANGUAGE STYLIZATION

BACKGROUND

Existing technologies for stylizing markup language documents have many limitations. With some existing stylization techniques, a source document to be stylized is required to adhere to a particular standard, such as extensible markup language (XML). Another limitation of existing stylization techniques is a lack of intrinsic versioning. That is, a source document to be stylized can not guarantee compatibility with a particular version of a style to be applied to the document. Intrinsically declarative relationships between styles and content are also typically lacking in existing stylization techniques. That is, procedure code is typically required to match portions of a source document with a particular style and to prevent subsequent styles from being applied to the specific portions of the source document. Furthermore, source documents typically cannot limit the affects of a stylization. In other words, a stylization can be designed to modify everything within a source document, without allowing the source to protect any areas. As a result, it is important that styles to be applied to a source document originate from a trusted source.

Another drawback to existing stylization techniques is the fact that there is no built-in support to persist a stylized document to be re-served providing the source file does not change. Rather, the source document is stylized each time the source document is requested by a client. Furthermore, with some existing stylization techniques, the code that is used to apply the stylization is not easily viewable, and is typically not easily modifiable.

Another limitation to existing stylization techniques is that the modifications that can be made to a source document are limited. That is, many existing techniques cannot be used to move or rearrange the underlying source markup. Additionally, some existing techniques require that the source document be explicitly tagged with class/style names at the point where the modification is to be applied. In other words, a source must include, be aware of, and explicitly assign sections of itself to one or more classes of styles. Furthermore, if a particular style is to be applied to or removed from several related source documents, each source document must be independently updated. Finally, with existing stylization techniques that are implemented on the client in a client-server environment, all of the style information for a particular source document is sent down to the client to be used when the web page is rendered. Rarely is all of the needed style information included in a single HTTP round trip to the server. Furthermore, style information that is irrelevant to the requested web page may also be transmitted.

SUMMARY

Markup language stylization is described herein.

A hypertext markup language (HTML) source document is associated with one or more overlay documents in a centralized manifest document. A manifest document may include a conditional relationship between a source document and an overlay document, such that the overlay document is only applied to the source document if the specified conditions are met. The source document is not required to contain any special tags or markers to enable stylization, but may include tags that indicate particular portions of the document that may or may not be modified by an overlay document. Overlay directives in an overlay document can specify modifications to source element attributes, content, and/or structure. Elements to which overlay directives may be applied may be deterministic or relative. Deterministic elements are identified based on a known attribute of the element. Deterministic elements are based on a relative position of the element in relation to another known element. Additionally, overlay documents may contain viewable samples and/or instructions that indicate how the overlay will affect a source document. Finally, source and overlay versioning may be implemented to insure that a particular overlay document is compatible with a particular source document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like features and components.

DETAILED DESCRIPTION

Figure 1:
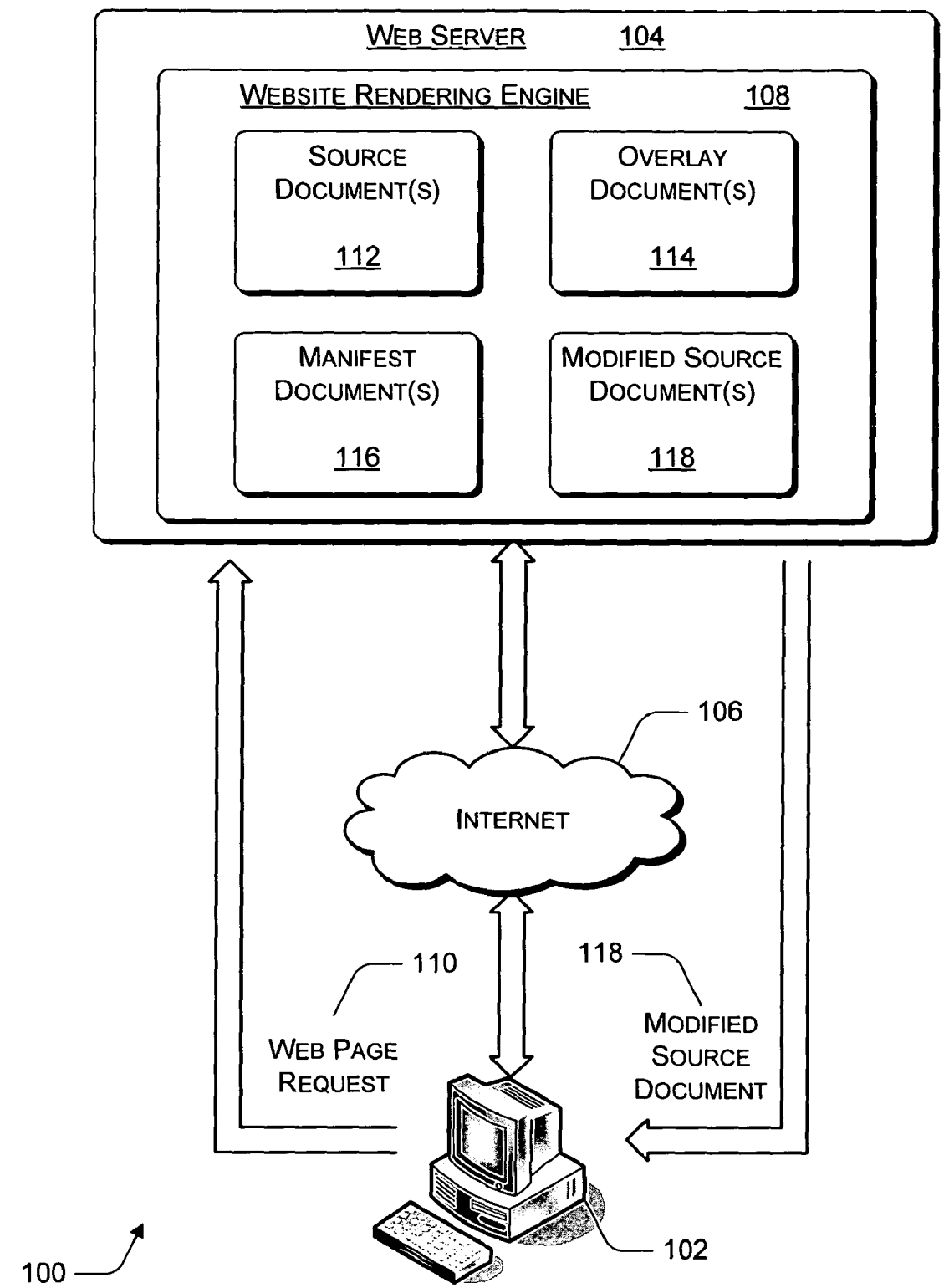
FIG. 1 illustrates an exemplary network environment in which markup language stylization may be implemented.

The following discussion is directed to markup language stylization.

A website rendering engine is configured to maintain and serve web pages that include hypertext markup language (HTML) content. The website rendering engine also maintains one or more overlay documents and one or manifest documents. Each overlay document may be applied to one or more HTML source documents to stylize, or otherwise modify, the HTML source. Each manifest document maps one or more overlay documents to one or more HTML source documents. Furthermore, a source document may be modified based on overlay documents specified in multiple manifest documents.

Two types of manifest documents may be associated with a source document. A pre-render manifest document specifies overlays that are applied to a source document, with the resulting modified source document then being saved so that the overlay(s) do not have to be applied again each time the source document is requested. A runtime manifest document specifies overlays that are applied to the source document each time the source document is requested, and the result is not saved. As an example, a runtime manifest document may be preferred over a pre-render manifest document when the overlay document specified in the pre-render manifest document is used to provide a single user customization of the source document. If a source document is specified in both a pre-render manifest document and a runtime manifest, the overlays specified in the pre-render manifest document are applied first, the result is saved, and then the overlays specified in the runtime manifest document are applied to the result that was saved.

Overlay documents may specify any number of changes to be made to a source document, including, but not limited to, modifying the content of an element, modifying an attribute of an element, removing an element, adding an element, or rearranging elements. No special tags or other types of markers are required in a source document to enable stylization of the document based on an overlay. However, a source document may include a tag that indicates the source is protected as a whole, and may include specific elements or blocks of elements that include a tag that indicates that portion of the source may be modified. Alternatively, a source document may be unprotected as a whole, and may include specific elements or blocks of elements that are protected from modification. Furthermore, source documents can declare versioning compatibility with overlay documents, preventing application of an overlay that is not compatible with the source document based on version.

Overlay documents are viewable and may contain additional instructions and/or samples that indicate to a designer how the overlay document will affect a source file. Overlay documents may include instructions to modify a deterministic element of a source file or a relative element of a source file. A deterministic element is identified based on a known attribute (e.g., tag name), while a relative element is identified based on its location within the source file relative to a known location (e.g., a <root> tag).

FIG. 1 illustrates an exemplary network environment 100 in which markup language stylization may be implemented. Computer system 102 requests a web page from web server 104 over a network such as the Internet 106. Web server 104 includes website rendering engine 108, which receives a web page request 110 from computer system 102. Website rendering engine 108 includes one or more HTML source documents 112, one or more overlay documents 114, and one or more manifest documents 116. Website rendering engine 108 may also include any number of modified source documents 118. Source documents 112 each include HTML content than can be rendered, or example, via a browser application. As an example, a source document 112 may represent a particular web page. Overlay documents 114 specify modifications (e.g., stylizations) that may be applied to one or more of source documents 112. Manifest documents 116 map one or more overlay documents 114 to one or more source documents 112. Modified source documents 118 may include stylized copies of one or more source documents 112. For example, an overlay document 114 may be applied to a particular source document 112, and the result may be stored as a modified source document 118.

When web page request 110 is received, website rendering engine 108 determines the source document 112 associated with the request, and determines whether or not any one or more manifest documents 116 pertain to the requested source document. If no manifest documents 116 are identified, then no additional stylization is performed, and the requested source document is returned. However, if a manifest document 116 is identified, then the manifest document 116 is examined to ascertain which of overlay documents 114 are to be applied to the requested source document 112. If the identified overlay document(s) have already been applied and the modified source document has been saved, then the modified source document 118 is returned. If any of the identified overlay document(s) have not already been applied, then the identified overlay document(s) 114 are applied to the requested source document 112, and a modified source document 118 is returned to computer system 102.

Figure 2:
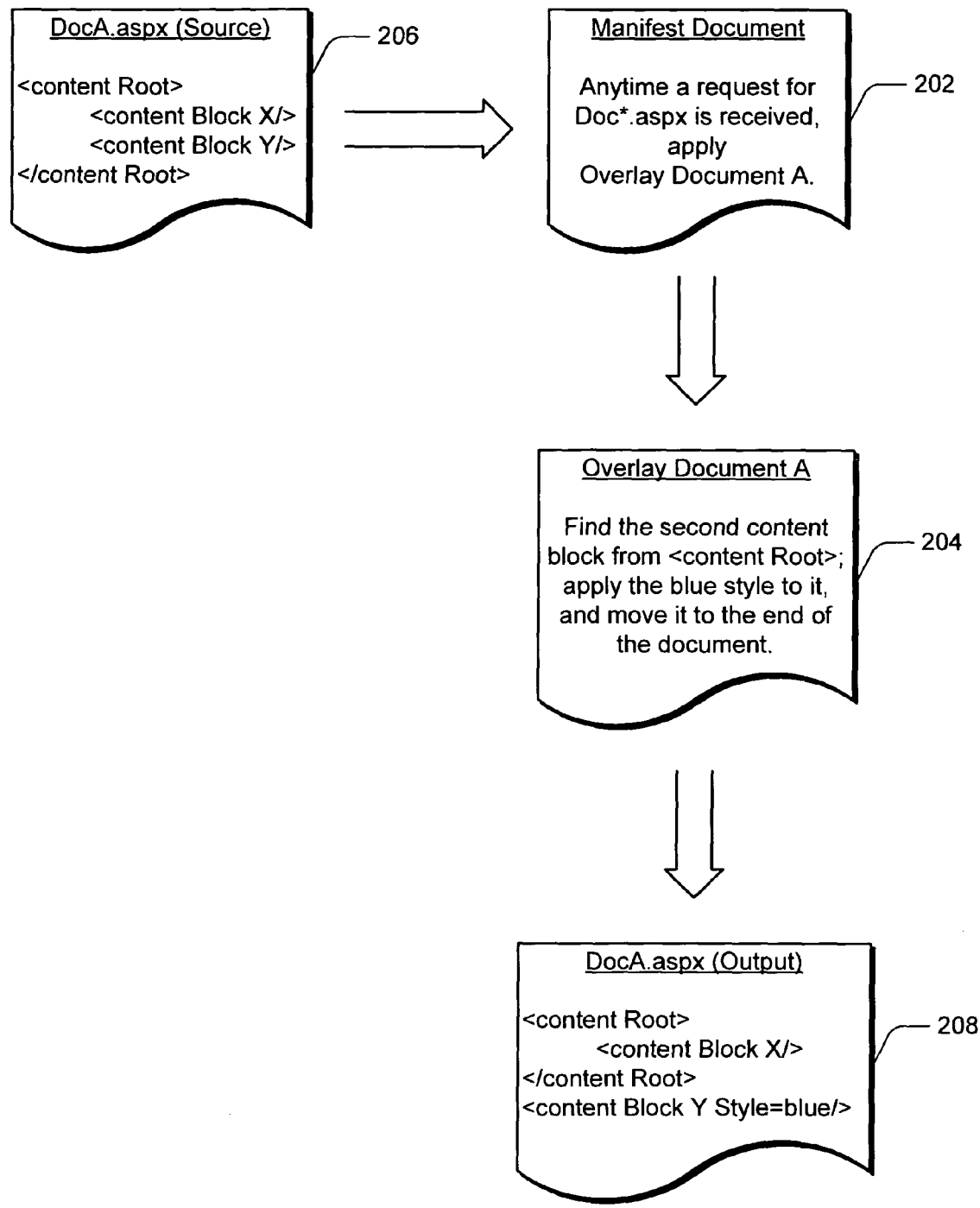
FIG. 2 illustrates exemplary generation of a modified source document based on an overlay document.

FIG. 2 illustrates exemplary generation of a modified source document based on an overlay document. Manifest document 202 indicates that overlay document 204 ("Overlay Document A") is to be applied to any source document that has a filename that fits the wildcard format "Doc*.aspx". Overlay document 204 contains directions for modifying a source document by applying a style named "blue" to the second content block after the <content Root> block, and moving that content block to the end of the source document. Accordingly, when a request for source document 206 ("DocA.aspx") is received, manifest document 202 indicates that Overlay Document A 204 is to be applied because the requested filename "DocA.aspx" fits the wildcard format "Doc*.aspx" specified in manifest document 202. Modified document 208 shows the result, in which the blue style has been applied to <content block Y> (the second block after the <content Root> block), and <content block Y> has been moved to the end of the document.

Figure 3:
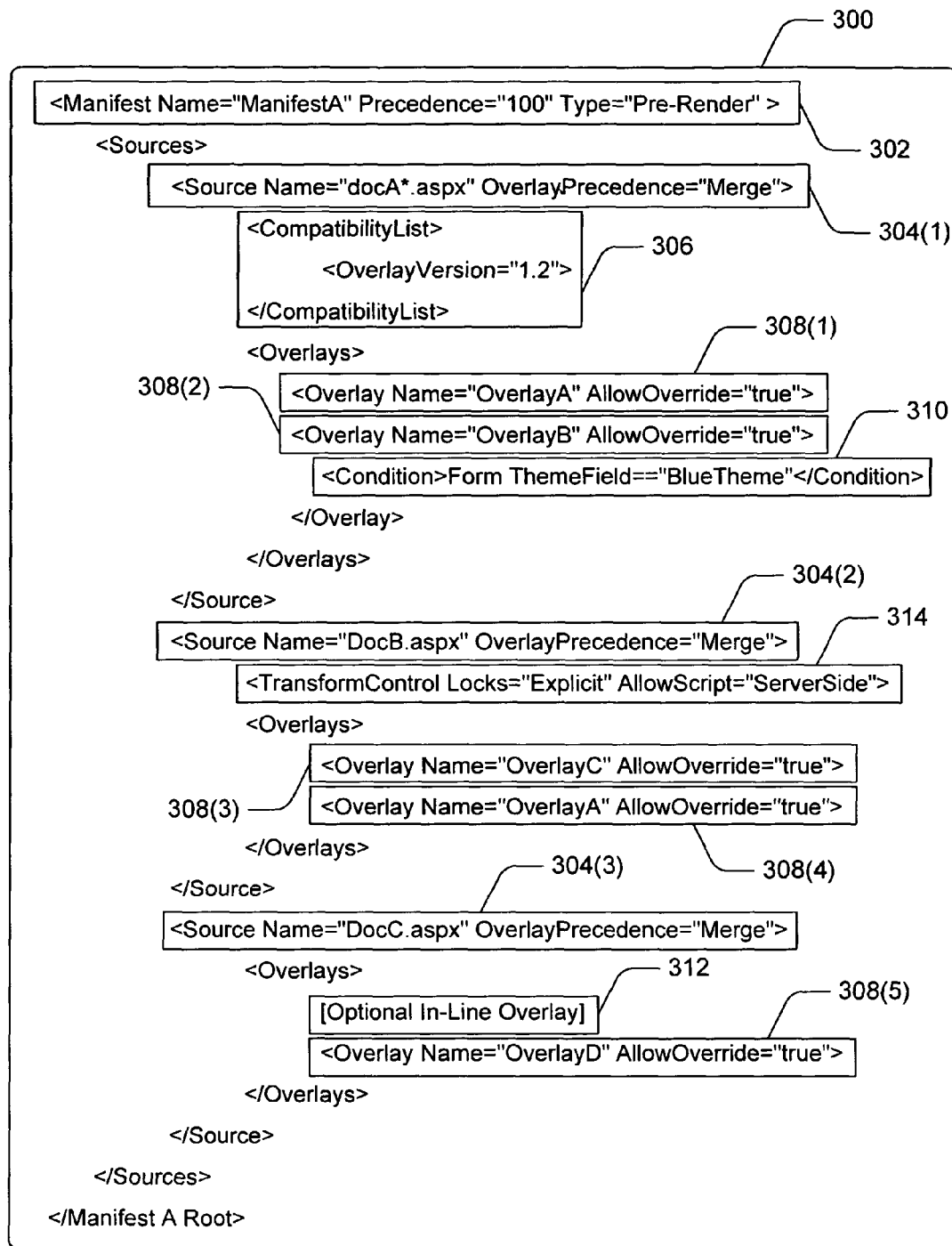
FIG. 3 illustrates an exemplary manifest document format.

In an exemplary implementation, manifest documents and overlay documents are formatted as extensible markup language (XML) documents. FIG. 3 illustrates an example manifest document format 300. Attributes of a manifest tag 302 in a manifest document 300 may include, but are not limited to, a name, a precedence value, and a type.

In the illustrated example, a precedence value is a number that can be used to determine an order in which to associate manifest documents with a particular source document. For example, if multiple manifest documents specify the same source document, then the overlay document(s) associated with the source document in the manifest document with the highest precedence value are applied to the source document before overlay document(s) associated with the source document in manifest documents with lower precedence values.

In the illustrated example, the type attribute is used to indicate whether the manifest document is a pre-render manifest document or a runtime manifest document. Overlay documents specified in a pre-render manifest document are applied to the source document before any overlay documents specified in a runtime manifest document. Furthermore, a modified source file may be saved after the application of overlay documents specified in a pre-render manifest document, and the overlay documents specified in a runtime manifest document are then applied to the saved modified source file.

Attributes of a source tag 304(1-3) in a manifest document 300 may include, but are not limited to, a name and an overlay precedence. The overlay precedence attribute is used to indicate how overlay documents specified in multiple manifest documents are to be applied to this source. In an exemplary implementation, the overlay precedence attribute may have one of three values: UseLowest, UseHighest, or Merge.

If a source is specified with an overlay precedence attribute value of UseLowest, then a list of all overlay documents associated with the source (according to multiple manifest documents) is compiled, but only those overlay documents specified in the manifest document with the lowest precedence value are applied. Similarly, if a source is specified with an overlay precedence attribute value of UseHighest, then a list of all overlay documents associated with the source (according to multiple manifest documents) is compiled, but only those overlay documents specified in the manifest document with the highest precedence value are applied. Finally, if a source is specified with an overlay precedence attribute value of Merge, then a list of all overlay documents associated with the source (according to multiple manifest documents) is compiled, and the overly documents are all applied to the source according to the manifest document precedence values, in order from highest to lowest. In each of these examples, if multiple overlay documents are to be applied, a first overly document is applied, then the second overlay document is applied to the result, and so on.

A compatibility list 306 may also be optionally specified in conjunction with overlays associated with a source. The compatibility list is used to indicate an overlay version with which the source document is compatible. Although not shown, in an exemplary implementation, the compatibility list may also be used to specify a document (e.g., an overlay document) that can be used to upgrade overlay documents from one version to another version.

Attributes of an overlay tag 308(1-5) in a manifest document 300 may include, but are not limited to, a name attribute and an allow override attribute. The allow override attribute is used to indicate whether additional overlays may be applied to a source after the application of the specified overlay. For example, if an overlay document is specified with an allow override attribute value of "true", then additional overlay documents may be applied to the source document after application of the specified overlay document. On the other hand, if an overlay document is specified with an allow override attribute value of "false", then no additional overlay documents may be applied to the source document after application of the specified overlay document.

Furthermore, overlay documents may be conditionally applied to a source document according to a condition 310 specified in association with an overlay tag 308(2) in a manifest document 300. For example, given the example shown in FIG. 3, OverlayB is only applied to source documents having a name that fits "docA*.aspx" (as specified in source tag 304(1) if the condition:

Form ThemeField=="BlueTheme"

is true for the source document (as specified in condition tag 310). Any number of and/or combination of conditions may be used to determine whether or not to apply a particular overlay document to a particular source document.

In addition to source tags and overlay tags, a manifest document may also include, in place of an overlay tag, in-line overlay directives 312. In other words, rather than referencing an external overlay document, the stylization commands (directives) that would typically be included in an external overlay document are included as part of the manifest document. Examples of overlay directives are described below with reference to FIG. 4.

As described herein, overlay documents are capable of adding script to a source document, which may be undesirable in some cases. Furthermore, it may be desirable for some source documents to include portions of markup language that may not be modified by any overlay documents. Accordingly, manifest document 300 may include a transform control tag 314, which may include, but is not limited to, a locks attribute and an allow script attribute. The locks attribute indicates whether portions of the source document (as indicated by source tag 304(2)) are implicitly locked or explicitly locked. If portions of the source document are explicitly locked (the locks attribute value="Explicit"), then any portion of the source document may be modified unless it is explicitly marked as locked. Similarly, if portions of the source document are implicitly locked (the locks attribute value="Implicit"), then only those portions of the source document that are explicitly not locked may be modified.

A source lock or source unlock attribute may be added to any element of a source document to indicate whether or not specific portions of the element may be modified by the application of an overlay document. For example, a source element:

```
<DIV id="SomeElement" SrcLock="Attributes">Text from source</DIV>
``` indicates that the attributes of this element may not be modified. Similarly, a source element:

```
<DIV id="SomeElement" SrcLock="Content">Text from source</DIV>
``` indicates that the content of this element (e.g., "Text from source") may not be modified. Similarly, a source element:

```
<DIV id="SomeElement" SrcLock="Structure">Text from source
    <table width="10px">
    <tr>
    <td>More text</td>
    </tr>
    </table>
</DIV>
``` indicates that the structure of this element may not be modified. In other words, the element itself may be modified, but any tags nested within the element may not be modified. Given the example above, the text "Text from source" may be modified, but the table width and the text "More text" may not be modified. Similarly, a source element:

```
<DIV id ="SomeElement" SrcUnlock="Attributes">Text from source</DIV>
``` indicates that the attributes of this element may be modified. The SrcUnlock attribute may also have values of "Structure" and "Content", as with the SrcLock attribute.

Figure 4:
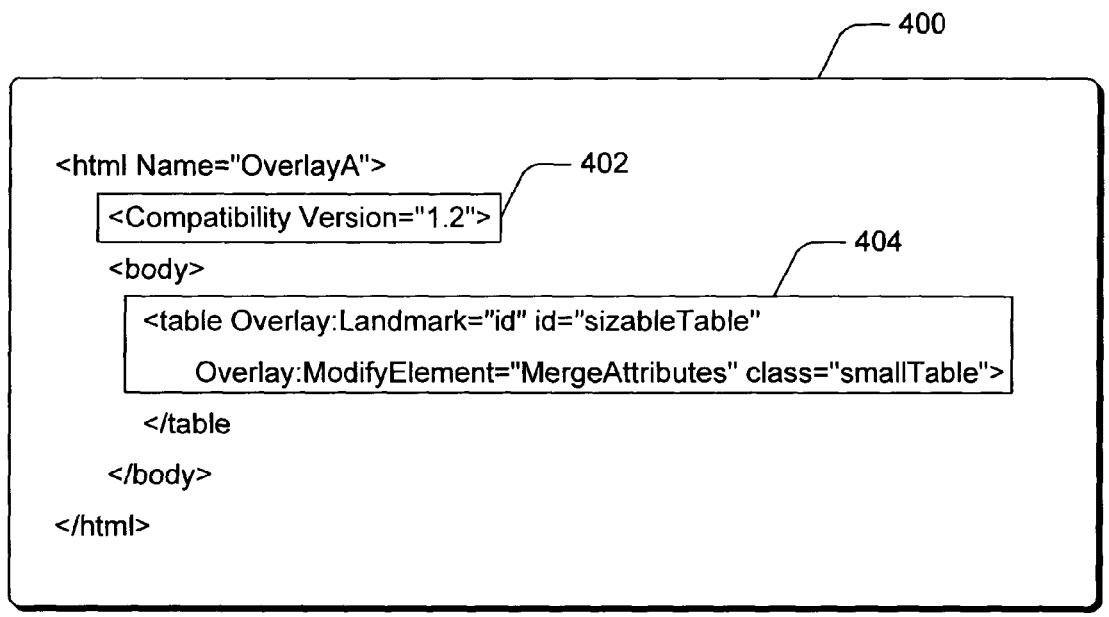
FIG. 4 illustrates an exemplary overlay document format.

FIG. 4 illustrates an example overlay document format 400. Compatibility tag 402 may be used to indicate, for example, a version of the overlay document, which can be used to insure compatibility between a source document and an overlay document. Directive 404 indicates that a table element in a source document is to be modified by merging the attributes in the overlay document with the attributes in the source document.

Any number of directives may be defined that can be included in an overlay document to specify a stylization to be applied to a source document. Exemplary directives may be defined to affect a node, an element, or content of an element. For example, given the code segment:

```
<DIV id="SomeElement">Text from source
    <table width="10px">
    <tr>
    <td>More text</td>
    </tr>
    </table>
</DIV>
``` the entire code segment is a node, the portion in bold is an element, and the italicized text is the content. Given these definitions of node, element, and content, exemplary directives may include, but are not limited to:

```
Landmark="[ElementID]"              Ignore="Content"
ModifyContent="InsertBefore"        Ignore="Node"
ModifyContent="InsertAfter"         EditNode="Cut"
ModifyContent="Replace"             EditNode="Copy"
ModifyElement="MergeAttributes"     EditNode="Insert"
ModifyElement="SyncAttributes"      EditNode="Paste"
ModifyElement="RenameTag:[NewTag]"  EditNode="Delete"
Ignore="Element"
```

The Landmark="[ElementID]" directive is used to deterministically identify a region of the source document, which can then be used as a reference for following directives. For example, the tag:

```
<table Overlay:Landmark="id" id="FrameTable">
``` can be used to locate any table in the source document that has an "id" attribute of "FrameTable". Similarly, the tag:

```
<table Overlay:Landmark="class" class="FrameTabStyle">
``` can be used to locate any table in the source document that has a "class" attribute of "FrameTabStyle". The landmark directive may be configured to specify a source document element based on any one or more element attributes.

In an exemplary implementation, the landmark directive is not used to stylize a source document, but rather, is used to identify a particular element in the source document from which elements for other directives may be relatively determined. Source document elements specified by any directives in an overlay document that do not specify a landmark attribute are located based on a relative position from the previous landmark directive. If no previous landmark directive is specified in the overlay document, then for a directive that does not specify a landmark attribute, the source document element is located based on a relative position from the root of the source document.

The ModifyContent="InsertBefore" directive is used to insert the contents of an element specified in the overlay document before the contents of a corresponding element in the source document. For example, given the source element:

```
<DIV id="SomeElement">Text from source</DIV>
``` and given the overlay directive:

```
<DIV Overlay:Landmark="id" Overlay:ModifyContent="InsertBefore"
    id="SomeElement"><b>Text from overlay</b></Div>
``` the resulting modified source element will read:

```
<DIV id="SomeElement"><b>Text from overlay</b>Text from
source</DIV>
```

Similarly, the ModifyContent="InsertAfter" directive is used to insert the contents of an element specified in the overlay document after the contents of a corresponding element in the source document. For example, given the source element:

```
<DIV id="SomeElement">Text from source</DIV>
``` and given the overlay directive:

```
<DIV Overlay:Landmark="id" Overlay:ModifyContent="InsertAfter"
    id="SomeElement"><b>Text from overlay</b></Div>
``` the resulting modified source element will read:

```
<DIV id="SomeElement">Text from source<b>Text from
overlay</b></DIV>
```

The ModifyContent="Replace" directive is used to replace the contents of an element specified in a source document with the contents of a corresponding element content specified in the overlay document. For example, given the source element:

```
<DIV id="SomeElement">Text from source</DIV>
``` and given the overlay directive:

```
<DIV Overlay:Landmark="id" Overlay:ModifyContent="Replace"
    id="SomeElement"><b>Text from overlay</b></Div>
``` the resulting modified source element will read:

```
<DIV id="SomeElement"><b>Text from overlay</b></DIV>
```

The ModifyElement="MergeAttributes" directive is used to merge the attributes of an element specified in the overlay document with the attributes of a corresponding element in source document. In the event of a collision (i.e. the same attribute is specified in both the source element and the overlay directive, but with different values), the attribute from the overlay is used. For example, given the source element:

```
<DIV id="SomeElement" width="500">Source Text</DIV>
``` and given the overlay directive:

```
<DIV Overlay:Landmark="id" Overlay:ModifyElement="MergeAttributes"
    id="SomeElement" width="700" class="blueBox">Text from
    overlay</Div>
``` the resulting modified source element will read:

```
<DIV id="SomeElement" width="700" class="blueBox">Source
    Text</DIV>
```

The ModifyElement="SyncAttributes" directive is used to replace the attributes of an element in the source document with the attributes specified in a corresponding directive in the overlay document. For example, given the source element:

```
<DIV id="SomeElement" width="500" style="green">Source
    Text</DIV>
``` and given the overlay directive:

```
<DIV Overlay:Landmark="id" Overlay:ModifyElement="SyncAttributes"
    id="SomeElement" width="700" class="blueBox">Text from
    overlay</Div>
``` the resulting modified source element will read:

```
<DIV id="SomeElement" width="700" class="blueBox">Source
    Text</DIV>
```

The ModifyElement="RenameTag:[NewTag]" directive is used to rename an element in the source document with the NewTag Value. For example, given the source element:

```
<DIV id="SomeElement">Text from Source</DIV>
``` and given the overlay directive:

```
<DIV Overlay:Landmark="id" Overlay:ModifyElement="RenameTag:
Span"
    id="SomeElement">Text from overlay</Div>
``` the resulting modified source element will read:

```
<Span id="SomeElement">Text from Source</Span>
```

The Ignore="Element", Ignore="Content", and Ignore="Node" directives are used to enable the inclusion of instructions and/or samples within an overlay document, but prevent those instructions and/or samples from affecting a source document when the overlay document is applied. For example, given the source element:

```
<DIV id="SomeElement" > Source Text</DIV>
``` and given the overlay directive:

```
<DIV Overlay:Landmark="id" Overlay:ModifyContent="InsertBefore"
id="SomeElement"> Overlay Text
<b Overlay:Ignore="Element">More Text </b></Div>
``` the <b></b> element will be ignored, and the resulting modified source element will read:

```
<DIV id="SomeElement">Overlay Text More Text Source Text </DIV>
```

Similarly, given the source element:

```
<DIV id="SomeElement" >Source Text</DIV>
``` and given the overlay directive:

```
<DIV Overlay:Landmark="id" Overlay:ModifyContent="InsertBefore"
id="SomeElement">Overlay Text
<b Overlay:Ignore="Content">More Text </b></Div>
``` the content of the <b></b> element (i.e., "More Text") is ignored, and the resulting modified source element will read:

```
<DIV id="SomeElement">Overlay Text Source Text<b></b></DIV>
```

Another example use of the Ignore="Content" directive follows. Given an overlay directive:

```
<DIV Overlay:Ignore="Content">The marketing group should fill the
following span with their ads: <span>Buy this car!</span></Div>
``` the content of the <DIV> tag (i.e., "The marketing group should fill the following span with their ads:") is ignored, while "<span>Buy this car!</span>" is copied to the source document. As illustrated, nested elements are not treated as content.

Finally, given the source element:

```
<DIV id="SomeElement" >Source Text</DIV>
``` and given the overlay directive:

```
<DIV Overlay:Landmark="id" Overlay:ModifyContent="InsertBefore"
id="SomeElement">Overlay Text
<b Overlay:Ignore="Node">More Text </b></Div>
``` everything from the <b> tag to the </b> tag is ignored, and the resulting modified source element will read:

```
<DIV id="SomeElement">Overlay Text Source Text</DIV>
```

The EditNode="Cut" directive is used to remove the identified element from the source document, and add it to a clipboard. Similarly, the EditNode="Copy" directive is used to place the identified element from the source document onto the clipboard without removing the element from the source document. In an exemplary implementation, multiple elements may be maintained on the clipboard at any given time.

The EditNode="Insert" and EditNode="Paste" directives are used in conjunction with the EditNode="Cut" and EditNode="Paste" directives to insert or paste elements from the clipboard into the source document. The EditNode="Insert" directive is used to insert an element from the clipboard before the specified element in the source document. The EditNode="Paste" directive is used to replace the specified element in the source document with an element from the clipboard. For example, given the following portion of a source document:

```
<DIV id="Element1" >Text from Source</DIV>
<DIV id="Element2" >More Text from Source</DIV>
``` and given the overlay directives:

```
<DIV Overlay:Landmark="id" Overlay:EditNode="Cut" id="Element1"/>
<DIV Overlay:Landmark="id" id="Element2"
    Overlay:EditNode="Paste:id:Element1"/>
``` the resulting modified portion of the source document will read:

```
<DIV id="Element1"></DIV>
<DIV id="Element2">Text from Source</DIV>
```

As another example, given the same portion of a source document:

```
<DIV id="Element1" >Text from Source</DIV>
<DIV id="Element2" >More Text from Source</DIV>
``` and given the overlay directives:

```
<DIV Overlay:Landmark="id" Overlay:EditNode="Copy"
    id="Element1"/>
<DIV Overlay:Landmark="id" id="Element2"
    Overlay:EditNode="Insert:id:Element1"/>
``` the resulting modified portion of the source document will read:

```
<DIV id="Element1">Text from Source</DIV>
<DIV id="Element2">Text from Source More Text from Source</DIV>
```

The EditNode="Delete" directive is used to remove an element from a source document. For example, given the following portion of a source document:

```
<DIV id="Element1" >Text from Source</DIV>
<DIV id="Element2" >More Text from Source</DIV>
``` and given the overlay directive:

```
<DIV Overlay:Landmark="id" Overlay:EditNode="Delete" id=
    "Element1"> </Div>
``` the resulting modified portion of the source document will read:

```
<DIV id="Element2" >More Text from Source</DIV>
```

Figure 5:
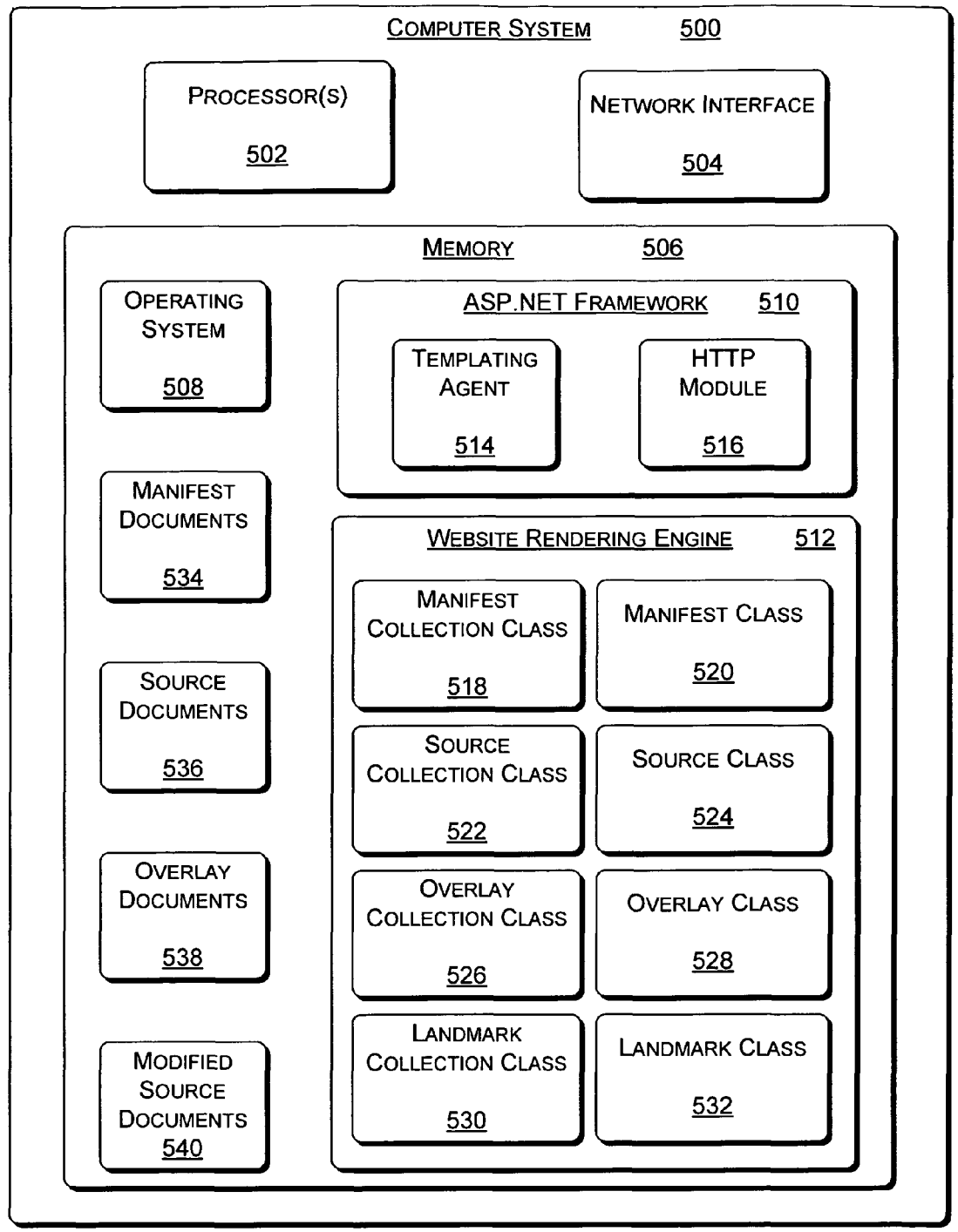
FIG. 5 illustrates selected components of an exemplary web server configured to implement markup language stylization.

FIG. 5 illustrates selected components of an exemplary computer system 500 configured to implement markup language stylization as described herein. Computer system 500 may be representative, for example, of a web server, and includes one or more processor(s) 502, network interface 504, and memory 506. Operating system 508, ASP.net framework 510, and website rendering engine 512 are stored in memory 506 and executed on processor(s) 502. ASP.net framework 510 includes templating agent 514 and HTTP module 516.

Templating agent 514 is configured to instantiate code behind classes for .aspx pages and preload the files with a change notification that indicates when the file needs to be reloaded. HTTP module 516 intercepts web page requests and forwards the requests to website rendering engine 512 prior to allowing any additional ASP processing to be performed based on the request. Alternate implementations may utilize an asapi component, which is similar to an HTTP module 516, an HTTP handler, which is based on a different asp.net class, or any other component that can be configured to intercept document requests prior to processing by asp.net.

In an exemplary implementation, website rendering engine 512 is implemented as an object-oriented application program interface (API) and includes manifest collection class 518, manifest class 520, source collection class 522, source class 524, overlay collection class 526, overlay class 528, landmark collection class 530, and landmark class 532. An exemplary relationship between the elements of website rendering engine 512 is illustrated and described below with reference to FIG. 6. Manifest documents 534, source documents 536, overlay documents 538, and modified source documents 540 are also stored in memory 506, and may be accessed by website rendering engine 512. In an exemplary implementation, each source document 536 is implemented as a standard aspx page such that requests for the source document are intercepted by http module 516. In an alternate implementation, other types of source document (e.g., .html documents) may be supported, for example, by enabling asp.net to intercept requests for documents other than aspx documents.

In an alternate implementation, computer system 500 may be implemented as, for example, a personal computer, and the components of website rendering engine 512 may be implemented to stylize any sort of markup language documents.

For example, a software application may include a user interface that is implemented as HTML pages. Such a user interface may be customized and/or upgraded by applying one or more overlay documents.

Figure 6:
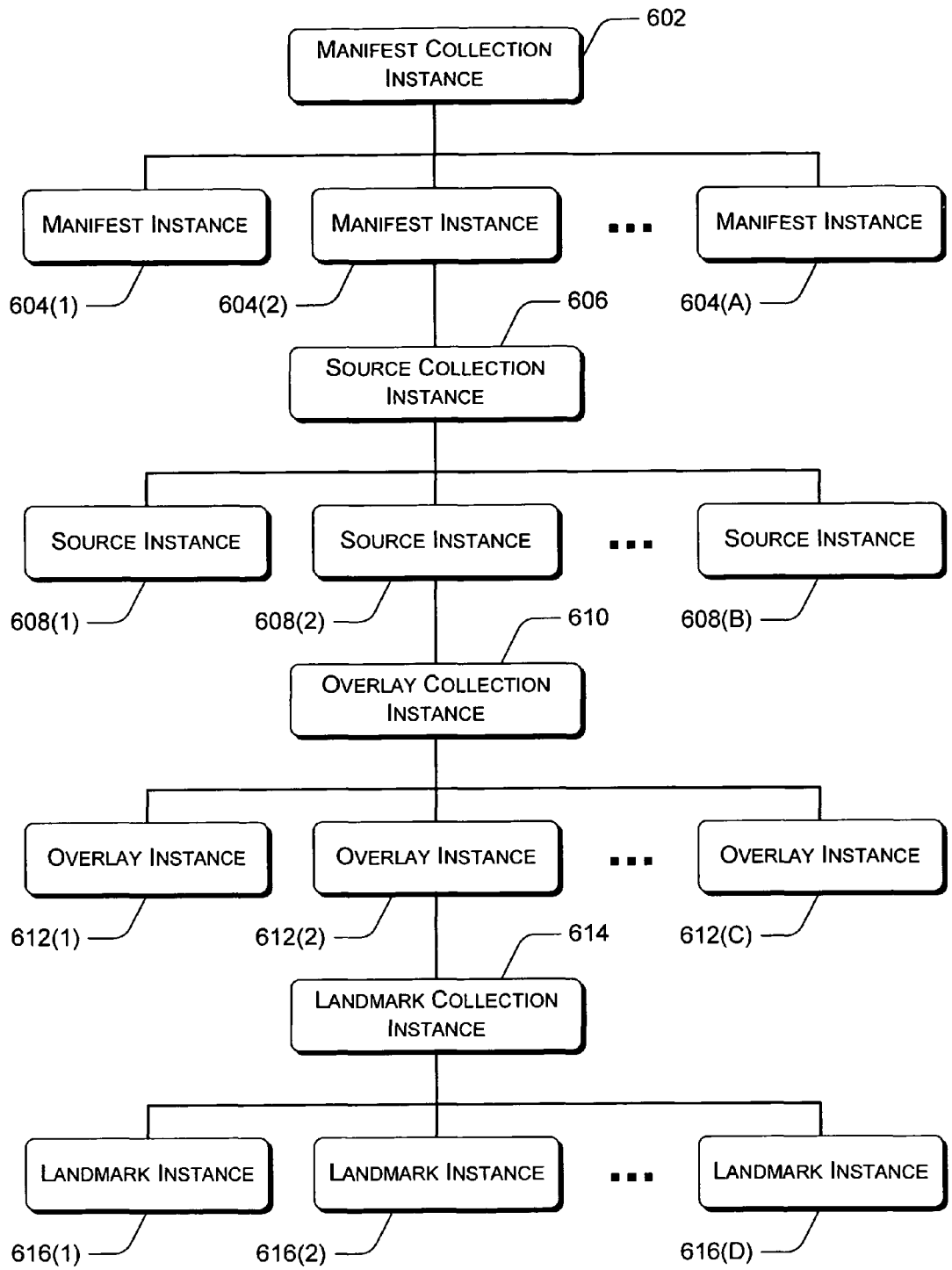
FIG. 6 illustrates an exemplary relationship between elements of the website rendering API, shown in FIG. 5

FIG. 6 illustrates an exemplary relationship between elements of website rendering engine 512, shown in FIG. 5. Manifest collection instance 602 represents an instantiation of manifest collection class 518. Manifest instances 604(1-A) each represent an instantiation of manifest class 520, and each manifest instance 604 inherits from manifest collection instance 602. Each manifest instance 604 represents a particular manifest document 534.

Source collection instance 606 represents a group of one or more source documents specified in the manifest document represented by manifest instance 602(2). Source collection instance 606 is an instantiation of source collection class 522. Source instances 608(1-B) each represent an instantiation of source class 524, and each source instance 608 inherits from source collection class 606. Each source instance 608 represents a particular source document 536.

Overlay collection instance 610 represents a group of one or more overlay documents to be applied to the source document represented by source instance 608(2), as indicated in the manifest document represented by manifest instance 604(2). Overlay collection instance 610 is an instantiation of overlay collection class 526. Overlay instances 612(1-C) each represent an instantiation of overlay class 528, and each overlay instance 612 inherits from overlay collection instance 610. Each overlay instance 612 represents a particular overlay document 538.

Landmark collection instance 614 represents a group of one or more landmark directives specified in the overlay document represented by overlay instance 612(2). Landmark collection instance 614 is an instantiation of landmark collection class 530. Landmark instances 616(1-D) each represent an instantiation of landmark class 532, and each landmark instance 616 inherits from landmark collection instance 614. Each landmark instance 612 represents a particular landmark directive, each of which corresponds to a particular element in the source document represented by source instance 608(2).

Methods for markup language stylization may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 7:
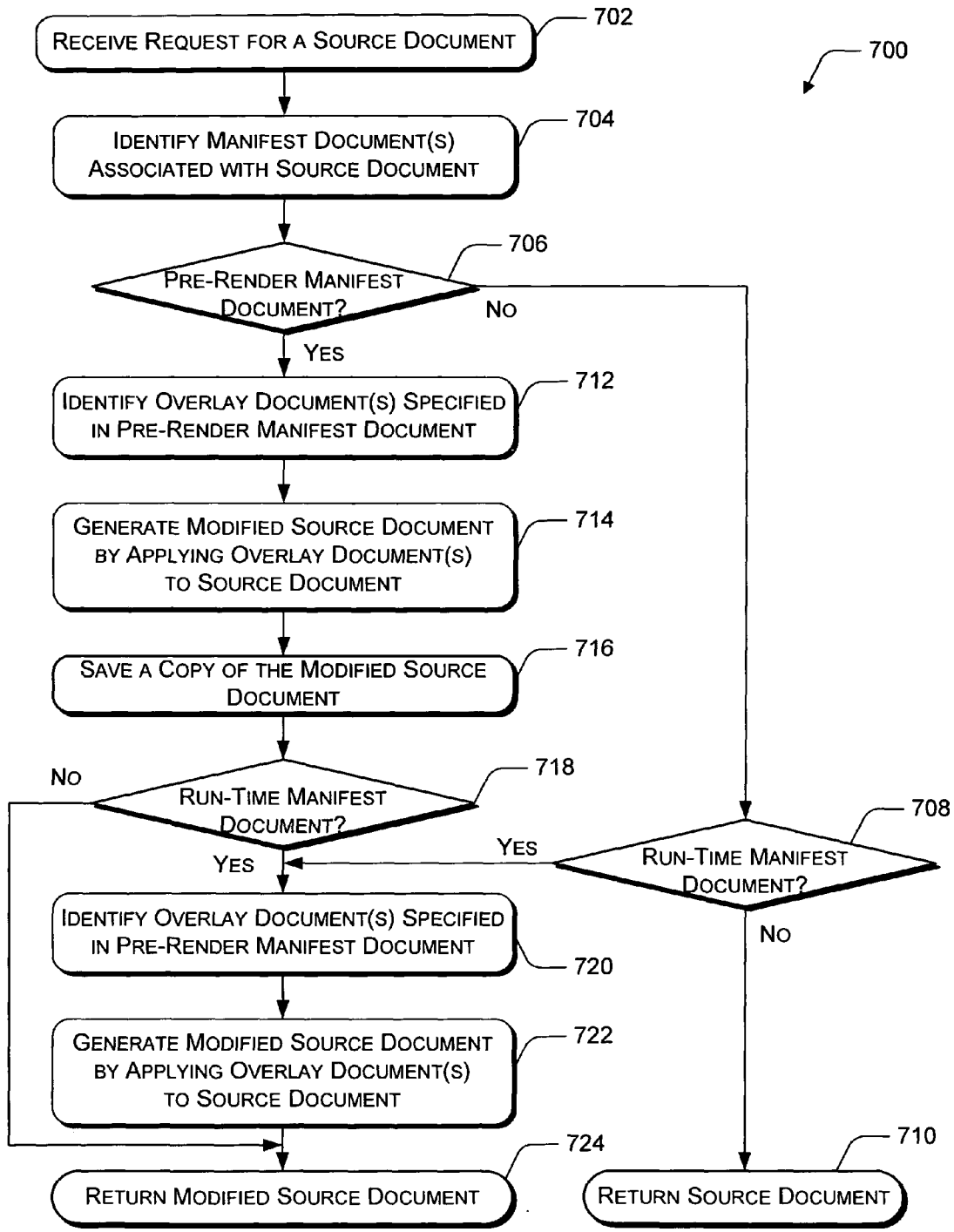
FIG. 7 illustrates an exemplary flow diagram for stylizing an HTML document.

FIG. 7 illustrates an exemplary method 700 for stylizing a markup language document. The order in which the method is described is not intended to be construed as a limitation, and any number of the described method blocks can be combined in any order to implement the method. Furthermore, the method can be implemented in any suitable hardware, software, firmware, or combination thereof.

At block 702, a request for a source document is received. For example, web server 104 receives web page request 110 from computer system 102.

At block 704, manifest documents associated with the source document are identified. For example, website rendering engine 108 examines manifest documents 116 to determine whether or not the requested source document is specified in any of manifest documents 116.

At block 706, it is determined whether or not a pre-render manifest document has been identified. For example, attributes of any manifest documents 116 identified as described above with reference to block 704 are examined to determine if any of the identified manifest documents are pre-render manifest documents.

If no pre-render manifest document has been identified in association with the requested source document (the "No" branch from block 706), then at block 708, it is determined whether or not a runtime manifest document has been identified. For example, attributes of any manifest documents 116 identified as described above with reference to block 704 are examined to determine if any of the identified manifest documents are runtime manifest documents.

If no runtime manifest document has been identified in association with the requested source document (the "No" branch from block 708), indicating that there are no manifest documents associated with the requested source document, then at block 710, the requested source document is returned with no applied stylization. If a runtime manifest document has been identified in association with the requested document (the "Yes" branch from block 708), then processing continues as described below with reference to block 720.

Referring back to block 706, if a pre-render manifest document has been identified in association with the requested source document (the "Yes" branch from block 706), then at block 712, one or more overlay documents are identified as specified in the pre-render manifest document. For example, a manifest document 116 that specifies the requested source document is examined to identify one or more overlay documents 114 to be applied to the requested source document.

At block 714, the identified one or more overlay documents are applied to the requested source document to generate a modified source document. For example, as described above with reference to FIG. 2, one or more overlay directives are applied to stylize the requested source document.

At block 716, a copy of the modified source document is saved. For example, the result of the application of the identified overlay document(s) 114 to the requested source document 112 is saved as a modified source document 118.

At block 718, it is determined whether or not a runtime manifest document was identified in association with the requested source document, as described above with reference to block 704. If no runtime manifest document was identified in association with the requested source document (the "No" branch from block 718), then at block 724, a copy of the saved modified source document is returned. On the other hand, if a runtime manifest document was identified in association with the requested source document (the "Yes" branch from block 718), then at block 720, one or more overlay documents are identified as specified in the identified runtime manifest document.

At block 722, the identified overlay documents are applied to the source document to generate a modified source document. If no pre-render manifest documents were identified with reference to block 706, but a runtime manifest document was identified with reference to block 708, then the identified overlay document(s) are applied to the requested source document. On the other hand, if a pre-render manifest document was identified with reference to block 706 and a modified source document was saved as described with reference to block 716, then the overlay document(s) identified as described with reference to block 720 are applied to the saved modified source document.

At block 724, the modified source document is returned. As described above, the modified source document that is returned may be the result of the application of one or more pre-render overlay documents and/or the application of one or more runtime overlay documents.

Figure 8:
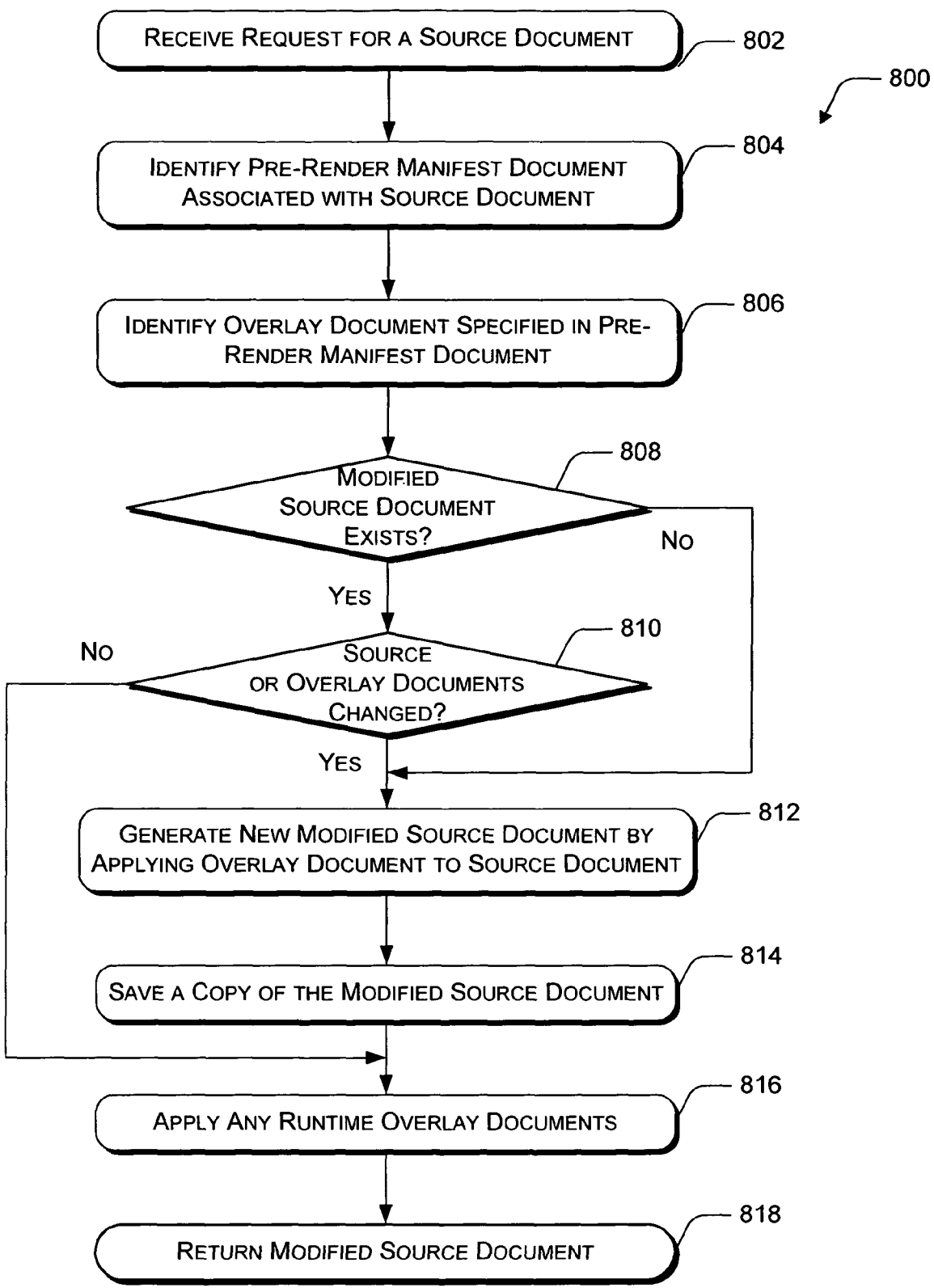
FIG. 8 illustrates an exemplary flow diagram for re-stylizing an HTML document when the source document or an overlay document has been modified.

FIG. 8 illustrates an exemplary method 800 for re-stylizing a markup language document after the original source document or a previously applied overlay document is modified. The order in which the method is described is not intended to be construed as a limitation, and any number of the described method blocks can be combined in any order to implement the method. Furthermore, the method can be implemented in any suitable hardware, software, firmware, or combination thereof.

At block 802, a request for a source document is received. For example, web server 104 receives web page request 110 from computer system 102.

At block 804, a pre-render manifest document associated with the requested source document is identified. For example, an exemplary method for identifying a pre-render manifest document is described above with reference to blocks 704 and 706 in FIG. 7.

At block 806, an overlay document specified in the pre-render manifest document is identified. An exemplary method for identifying an overly document specified in a pre-render manifest document is described above with reference to block 712 in FIG. 7

At block 808, it is determined whether or not a modified version of the source document is currently being maintained. For example, website rendering engine 108 searches for a modified source document 118 that corresponds to the requested source document.

If no modified source document currently exists (the "No" branch from block 808), then processing continues as described below with reference to block 812. On the other hand, if a modified source document currently exists (the "Yes" branch from block 808), then at block 810, it is determined whether the original source document or the identified overlay document has changed since the modified source document was generated. For example, change notifications generated by operating system 508 are examined to determine whether the original source document or the overlay document has changed since the modified source document was generated.

If neither the source document nor the overlay document has changed (the "No" branch from block 810), then processing continues as described below with reference to block 816. On the other hand, if either the source document or the overlay document has changed (the "Yes" branch from block 810), then at block 812, a new modified source document is generated by applying the overlay document to the source document.

At block 814, a copy of the new modified source document is saved.

At block 816, any overlay documents identified in a runtime manifest document associated with the source document are applied to the modified source document. At block 818, the modified source document is returned.

Figure 9:
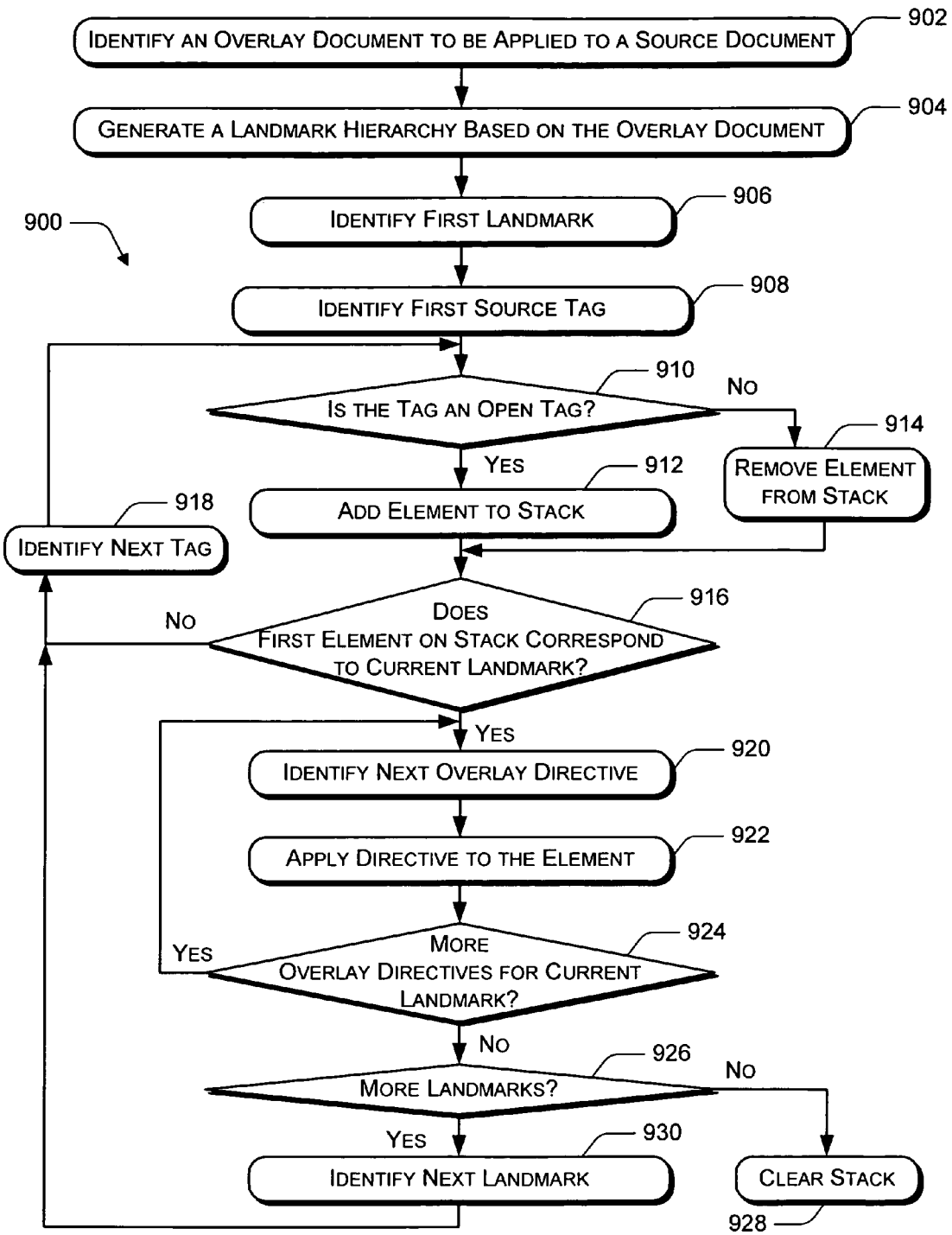
FIG. 9 illustrates an exemplary flow diagram for applying an overlay document to a source document.

FIG. 9 illustrates an exemplary method 900 for applying an overlay document to a source document. The order in which the method is described is not intended to be construed as a limitation, and any number of the described method blocks can be combined in any order to implement the method. Furthermore, the method can be implemented in any suitable hardware, software, firmware, or combination thereof.

At block 902, an overlay document to be applied to a source document is identified. For example, referring to FIG. 1, web server 104 receives web page request 110, which corresponds to a source document 112. Website rendering engine 108 then identifies an overlay document 114 that is associated with the source document 112 in a manifest document 116.

At block 904, a landmark hierarchy is generated based on the identified overlay document. For example, the overlay document is parsed, and a list of landmarks to which directives may be applied is generated. As described above, landmarks may be declarative or relative. Furthermore, as described above with reference to FIG. 4, a landmark may be generated based on a landmark directive (that is not used to modify the source document) or based on a directive that includes a landmark attribute.

At block 906, the first landmark in the landmark hierarchy is identified. For example, a pointer may be instantiated in association with the landmark hierarchy, and set to the first landmark.

At block 908, a first source tag is identified. For example, the source document is parsed, and the first tag is identified based on a search for a "<" character.

At block 910, it is determined whether or not the identified tag is an open tag. For example, if the identified "<" character is not followed by a "/" character, then the identified tag is an open tag.

If the identified tag is an open tag (the "Yes" branch from block 910), then at block 912, the element associated with the tag is added to a stack. For example, the identified "<" character followed by any additional characters, up to and including a ">" character are added to a stack or similar data structure.

According to markup language formats, the first tag encountered in a source document should be an open tag, however, later tags may be either open or close tags. So, as processing continues, if the identified tag is a close tag (the "No" branch from block 910), then at block 914, an element is removed from the stack. In an exemplary implementation, a new document is created to hold the modified source document. When an element is removed from the stack, it is written to the end of the new modified source document.

At block 916, a determination is made as to whether or not the first element on the stack corresponds to the current landmark. For example, attributes and/or conditions specified in the landmark are compared to the element.

If the first element on the stack does not correspond to the current landmark (the "No" branch from block 916), then at block 918, the next tag in the source document is identified. Processing then continues as described above with reference to block 910.

On the other hand, if the first element on the stack does correspond to the current landmark (the "Yes" branch from block 916), then at block 920, the next overlay directive associated with the current landmark is identified.

At block 922, the current overlay directive is applied to the first element on the stack. For example, the stylization specified in the directive is applied to the element on the stack. At this point, the element is left on the stack in case additional directives need to be applied to the same landmark.

At block 924, it is determined whether or not there are additional overlay directives associated with the current landmark. If there are additional overlay directives associated with the current landmark (the "Yes" branch from block 924), then processing continues as described above with reference to block 920.

If there are no additional overlay directives associated with the current landmark (the "No" branch from block 924), then at block 926, it is determined whether or not there are additional landmarks. If there are no more landmarks (the "No"

branch from block 926), then at block 928, the stack is cleared. For example, the remainder of the source document is processed to through the stack as described with reference to blocks 910, 912, 914, and 918, such that the modified source document is complete.

On the other hand, if it is determined that there are additional landmarks (the "Yes" branch from block 926), then at block 930, the next landmark is identified. Processing then continues as described above with reference to block 918.

The method shown in FIG. 9 is based on an assumption that each landmark specified in the overlay document exists in the source document to which the overlay document is being applied. Further processing may be implemented to account for situations in which one more landmarks identified in the overlay document do not exist in the source document. In an exemplary implementation, no errors are generated if a landmark is not found in a source document, but rather, an attempt is made to identify the next specified landmark.

Although embodiments of markup language stylization have been described in language specific to structural features and/or methods, it is to be understood that the subject of the appended claims is not necessarily limited to the specific features or methods described. Rather, the specific features and methods are disclosed as exemplary implementations of markup language stylization.

The invention claimed is:

1. A method comprising:
   receiving a request for a markup language source document;
   identifying a manifest document associated with the requested markup language source document;
   determining to select, from a plurality of overlay documents, at least one overlay document that fulfills an attribute condition specified in the manifest document, wherein the markup language source document specifies one or more overlay document versions with which the markup language source file is compatible, wherein when the markup language source document comprises a section of markup language that specifies that the section is designated as immutable to prevent modification via the at least one overlay document, a directive of immutability is selected from a group comprising:
      prevention, of a specified attribute of the section, from modification by the at least one overlay document;
      prevention, of specified content of the section, from modification by the at least one overlay document; and
      prevention, of a specified structure of the section, from modification by the at least one overlay document;
   in an event no overlay document is selected, in response to the request, returning the markup language source document; and
   in an event at least one overlay document is selected:
      providing an interface for the at least one overlay document to modify the presentation of the markup language source document, wherein when an associated version of the at least one overlay document is not compatible with the markup language source document, the interface utilizes an associated document to upgrade the at least one overlay document to another version, wherein no special tags or other types of markers are required in the markup language source document to enable modification of the presentation of the markup language source document as specified by the at least one overlay document, the interface having a plurality of functions for modifying the presentation of the markup language source document, the functions comprising:
         modifying element content;
         modifying element attributes;
         removing elements;
         adding elements;
         rearranging elements; and
         stylization of elements;
      generating a modified markup language source document by applying the at least one overlay document to the requested markup language source document; and
      in response to the request, returning the modified markup language source document.

2. The method as recited in claim 1, wherein identifying a manifest document comprises determining that a filename associated with the markup language source document matches a filename specified in the manifest document, wherein the filename specified in the manifest document includes at least one wildcard character.

3. The method as recited in claim 1, wherein identifying a manifest document comprises:
   determining that a filename associated with the markup language source document matches a filename specified in the manifest document.

4. The method as recited in claim 1, further comprising:
   maintaining a copy of the modified markup language source document;
   receiving a second request for the markup language source document;
   determining if the markup language source document has been edited since the modified markup language source document was generated;
   in an event the source document has been edited since the modified markup language source document was generated:
      generating a new modified markup language source document by applying the at least one overlay document to the markup language source document that has been edited; and
      returning the new modified markup language source document;
   in an event the markup language source document has not been edited since the modified markup language source document was generated, returning the copy of the modified markup language source document.

5. The method as recited in claim 1, further comprising:
   maintaining a copy of the modified markup language source document;
   receiving a second request for the markup language source document;
   determining that an overlay document that was selected has been edited since the modified markup language source document was generated;
   generating a new modified markup language source document by applying the overlay document that has been edited to the markup language source document; and
   in response to the second request, returning the new modified markup language source document.

6. A system comprising:
   one or more processors;
   one or more memories;
   computer executable instructions stored on the one or more memories and executable by the one or more processors, the computer executable instructions comprising:
      a source document having hypertext markup language (HTML) content;

an overlay document having extensible hypertext markup language (XHTML) content that specifies changes to be made to an HTML document, wherein the source document specifies an overlay document version with which the source document is compatible, wherein no special tags or other types of markers are required in the source document to enable the changes to be made as specified by the overlay document, wherein when the source document comprises a section of HTML content that specifies that the section is designated as immutable, modification of the section via the overlay document is prevented, the section designated as immutable selected from a group consisting of:

attributes of an HTML element of the source document;

content of an HTML element of the source document; and structure of an HTML element of the source document;

a manifest document that defines a relationship between the source document and the overlay document such that the overlay document is usable for modifying the source document when an attribute condition in the manifest document related to the source document is fulfilled;

a document used to upgrade the overlay document from one version to another version; and an interface to utilize the overlay document to modify the presentation of the source document when an associated version of the overlay document is compatible with the source document.

7. The system as recited in claim 6, wherein the overlay document has an overlay version.

8. The system as recited in claim 6, wherein when the source document comprises a section of HTML content that is designated as modifiable, the overlay document may only modify the designated section of HTML content.

9. The system as recited in claim 6, wherein the overlay document, when applied to the source document, modifies a content of an element in the source document.

10. The system as recited in claim 6, wherein the overlay document, when applied to the source document, modifies an attribute of an element in the source document.

11. The system as recited in claim 6, wherein the overlay document, when applied to the source document, rearranges elements to modify a structure of the source document.

12. The system as recited in claim 6, wherein the overlay document is contained within the manifest document.

13. One or more computer storage media encoded with computer-executable instructions that, when executed, direct a computing system to perform acts comprising:

identifying an overlay document to be applied to a source document, wherein the source document specifies one or more overlay versions with which the source file is compatible, wherein when an associated version of the overlay document is not compatible with the source document, an associated document is utilized to upgrade the overlay document to another version, wherein no special tags or other types of markers are required in the source document to enable application of the overlay document, wherein when the source document comprises a section of content that specifies that the section is designated as immutable, modification of the section via the overlay document is prevented, the section designated as immutable selected from a group consisting of:

attributes of an element of the source document;

content of an element of the source document; and structure of an element of the source document;

generating a landmark hierarchy based on landmark definitions included in the overlay document, where each landmark of the landmark hierarchy represents one of either a deterministic or a relative reference to a location of one or more elements that are present in the source document, wherein the one or more elements each have attributes corresponding to a definition of each landmark in the overlay document;

stepping through elements in the source document to identify an element in the source document that corresponds to a first landmark in the landmark hierarchy;

identifying an overlay directive associated with the first landmark, an overlay directive being chosen from a plurality of directives; and generating a modified element by applying the identified overlay directive to the element in the source document that corresponds to the first landmark in the landmark hierarchy.

14. The one or more computer storage media as recited in claim 13, the acts further comprising copying the source document to a modified source document, and replacing the element in the source document that corresponds to the first landmark in the landmark hierarchy with the modified element.

15. The one or more computer storage media as recited in claim 13, wherein the overlay directive comprises instructions to modify content of the element in the source document that corresponds to the first landmark in the landmark hierarchy.

16. The one or more computer storage media as recited in claim 13, wherein the overlay directive comprises instructions to modify an attribute of the element in the source document that corresponds to the first landmark in the landmark hierarchy.

17. The one or more computer storage media as recited in claim 13, wherein the overlay directive comprises instructions to modify a location within the source document of the element in the source document that corresponds to the first landmark in the landmark hierarchy.

18. The one or more computer storage media as recited in claim 13, wherein the overlay directive comprises instructions to remove, from the source document, the element in the source document that corresponds to the first landmark in the landmark hierarchy.

19. The method as recited in claim 1 further comprising:

maintaining a copy of the modified markup language source document;

receiving a second request for the markup language source document;

in an event the markup language source document has been edited since the modified source document was generated:

generating a new modified markup language source document by applying the at least one overlay document to the markup language source document that has been edited; and returning the new modified markup language source document;

in an event the markup language source document has not been edited since the modified markup language source document was generated and none of the overlay documents that fulfill the attribute condition specified in the manifest document have been modified, returning the copy of the modified markup language source document; and in an event an overlay document that fulfills the attribute condition specified in the manifest document has been edited since the modified markup language source document was generated:
  generating a new modified markup language source document by applying the overlay document that has been edited to the markup language source document, wherein generating a new modified markup language source document comprises:
    generating a landmark hierarchy based on the overlay document that has been edited, where each landmark represents an element that may be present in the markup language source document;
    stepping through elements in the markup language source document to identify elements that corresponds to a first landmark in the landmark hierarchy;
    identifying an overlay directive associated with the first landmark; and
  generating a modified element in the modified markup language source document by applying the identified overlay directive to an element in the markup language source document that is identified as corresponding to the first landmark in the landmark hierarchy.

20. The system as recited in claim 6, wherein the interface has a plurality of functions, the functions comprising:
  when the associated version of the overlay document is not compatible with the source document, utilizing the document used to upgrade the overlay document to upgrade the overlay document to another version;
  modifying element content;
  modifying element attributes;
  removing elements;
  adding elements;
  rearranging elements; and
  stylization of elements.

21. The one or more computer storage media as recited in claim 13, wherein the plurality of directives comprise:
  modifying element content;
  modifying element attributes;
  removing elements;
  rearranging elements; and
  stylization of elements.

* * * * *